3,020,199
IMIDAZOLINE STABILIZERS

Jack A. Williams, Tulsa, Okla., and Arthur G. Hirsch, Dyer, Ind., assignors to Standard Oil Company, Chicago, Ill., a corporation of Indiana
No Drawing. Filed Sept. 30, 1958, Ser. No. 764,221
12 Claims. (Cl. 167—33)

This invention relates to pesticides, and particularly to an additive for inhibiting the decomposition of halogenated organic insecticides, herbicides, and fungicides.

The storage of emulsifiable hydrocarbon solutions of halogenated organic insecticides such as DDT or chlordane and of halogenated organic herbicides such as 2,4-D frequently gives rise to serve corrosion of metal containers used for storing the solutions. This corrosion is characterized by the formation of black iron halides on the container walls, with subsequent pitting and ultimate destruction of the container. The corrosion has been traced to the decomposition of the halogenated organic pesticide leading to the liberation of a hydrogen halide such as HCl, the precursor of hydrochloric acid.

We have now discovered that a small concentration, normally from 0.001 to about 1.0 percent by weight, of a substituted imidazoline salt more fully defined hereinafter, provides exceptional protection against the decomposition of halogenated pesticides. Moreover, emulsifiable insecticide and herbicide concentrates in hydrocarbon solvents preserve their emulsion properties for substantially longer periods when the present additive is employed.

The substituted imidazoline salt used in this invention can be represented by the following probable general structure:

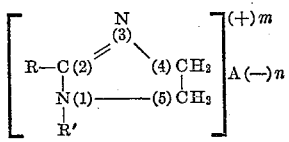

in which R is an alkyl, alkenyl or alkadienyl group or mixtures thereof, having from about 6 to about 24 carbon atoms, R' is hydrogen or a $CH_2CH_2X$ group where X is a polar group such as hydroxy, amino, carboxyl or an alkyl group containing one of such polar group, A is an anion of an aliphatic or cycloaliphatic carboxylic acid having from about 10 to about 60 carbon atoms, and $n$ and $m$ are integers 1, 2, or 3.

The imidazolines (or glyoxalidine) employed as starting materials are made by well known methods such as described in Wilson U.S. No. 2,267,965 and Wilkes U.S. No. 2,214,152. Briefly, the method involves reacting a fatty acid with an aliphatic polyamine with the elimination of water.

Specific examples of imidazolines suitable for use in the present invention include 1-hydroxyethyl-2-heptadecenyl imidazoline, 1-aminoethyl-2-undecyl imidazoline, 1-hydroxyethyl-2-pentadecyl imidazoline, 1-aminoethyl-2-heptadecenyl imidazoline, 1-aminoethyl-2-heptadecyl imidazoline, 1-hydroxyethyl-2-heptadecyl imidazoline, 1-aminoethyl-ethylamine-2-heptadecenyl imidazoline, 2-pentadecyl imidazoline, and the like.

Several commercial imidazoline compounds are available which can be used in the preparation of the above salts. Examples of such commercial products are "Amine O" marketed by the Geigy Chemical Company, "Amine 220," marketed by Carbide and Carbon Chemicals Company, and "Nalcamine G–12" marketed by National Aluminate Corporation, all of which contain R groups (above structure) of 17 carbon atoms and a hydroxyl polar group (X in the above structure). Another commercial imidazoline marketed by the National Aluminate Corporation is "Nalcamine G–39M" which has the same R group but contains $-NH_2$ in its polar side group (X).

The carboxylic acid used in the formation of the substituted imidazoline salt can be any monomeric, dimeric or polymeric aliphatic or cycloaliphatic carboxylic acid such as for example, oleic acid, stearic acid, tall oil acids, naphthenic acids, linoleic acid and polymeric linoleic acids such as the dimer acids, trimer acids and higher polymeric acids or mixtures of such polymeric acids.

The preferred carboxylic acids used are organic aliphatic dicarboxylic acids produced by the condensation of two like or unlike molecules of a polyethenoid monocarboxylic fatty acid, to give a product which is essentially a dimer, with minor amounts of monomers and trimers.

In general, the dimeric acids of this invention are produced by the condensation of two like or unlike unsaturated aliphatic monocarboxylic acids having between about 16 and about 18 carbon atoms per molecule. The dimeric acids are characterized by having the two carboxylic acid groups attached to a single six-membered hydroaromatic ring through a plurality of $(CH_2)$-groups the number of such groups being dependent upon the number of such groups between the carbon atom of the carboxylic acid group and the nearer carbon of the nearest double bond of the monocarboxylic acid. The substituents are alkyl or alkenyl groups depending upon the degree of unsaturation of the monocarboxylic acid from which the dimeric acid is derived. Thus, the dimeric acids derived from a diethenoid fatty acid, or a dienoic acid having a single six-membered hydroaromatic ring is substituted in two immediately adjacent positions by two alkyl groups and in two other immediately adjacent positions by carboxylic acid groups separated from the hydroaromatic ring in one substituent by a straight chain unsaturated aliphatic group and in the other by a straight chain saturated aliphatic group. Consequently, the dimeric acids when prepared from the individual monocarboxylic acid are represented by two formulae

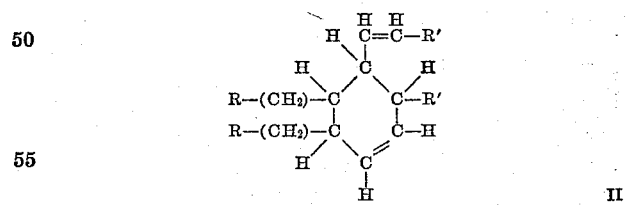

where R is $CH_3(CH_2)_n-$, and R' is $(CH_2)_mCOOH$ and $n$ is a small number one more than the number of $CH_2$ groups between the terminal $CH_3$ group and the nearer carbon of the nearer double bond of the diethenoid monocarboxylic acid from which the dimeric acid is derived and $m$ is a small number representing the number of $CH_2$ groups between the carbon of the carboxylic group and the nearer carbon of the nearer double bond of the diethenoid monocarboxylic acid from which the dimeric acid is derived, and

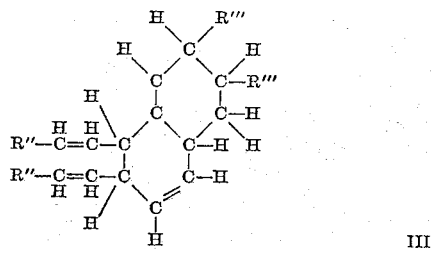

III where R'' is $CH_3(CH_2)_n$ and R''' is $(CH_2)_mCOOH$ and $n$ and $m$ have the same significance as before. The dimeric acids are dicarboxylic acids derived from two molecules of polyethenoid fatty acids of drying and semi-drying oils and from fatty acids such as ricinoleic acid which upon dehydration become polyethenoid fatty acids. Therefore, in general, dimeric acids are dicarboxylic acids derived by the condensation of two molecules of one or more polyethenoid aliphatic monocarboxylic acids.

While the dimeric acids can be used in pure form, for practical reasons impure forms are used. That is to say, the dimeric acids are not presently available at commercialy attractive costs in pure form.

A useful, commercially available dimeric carboxylic acid is commercially available from Emery Industries, Inc. under the trade name "Emery 955-Dimer Acid." Since the commercial product is produced by dimerization of linoleic acid, it is usually referred to as dilinoleic acid. The commercial acid typically contains about 85% of dilinoleic acid, about 12% of trilinoleic acid and about 3% of monomeric acid.

Typical specifications for the commercial product are as follows:

| | |
|---|---|
| Iodine value | 80–95 |
| Acid value | 180–192 |
| Saponification value | 185–195 |
| Unsaponifiable_____Max. percent | 2.0 |
| Color, Gardner_____Max | 12 |
| Neutralization equivalent | 290–310 |
| Refractive index at 25° C | 1.4919 |
| Specific gravity at 15.5 C./15.5° C | 0.95 |
| Flash point, °F | 530 |
| Fire point, °F | 600 |
| Viscosity at 25° C. (Gardner-Holdt) | Z4 |
| Viscosity at 25° C. centistokes | 10,000 |
| Viscosity at 100° C. centistokes | 100 |

Another satisfactory polymer acid is commercially available from the Harchem Division of Wallace & Tiernan Co. under the trade name of "D–50 Acid." A similar product is marketed by Rohm & Haas Company under the trade name "VR–1 Acids." Such acids may be produced as by-product still residues in the manufacture of sebacic acid by the distillation of castor oil in the presence of caustic. A method of obtaining such by-product still residues in the preparation of sebacic acid is described in U.S. 2,470,849 issued to W. E. Hanson May 24, 1959. The mixture of high molecular weight unsaturated fatty acids comprises monomers, dimers, trimers and higher polymers in the ratio of from about 45% to about 55% of a monomers and dimers fraction having a molecular weight in the range of from about 300 to 600, and from about 45% to about 55% of a trimers and higher polymer fraction having a molecular weight in excess of 600. The fatty acid polymers result in part from a thermal polymerization of fatty acid type constituents of the castor oil, and in part from other reactions, such as the inter-molecular esterification, of such acid to form high molecular weight products. The acid mixture, which is mainly a mixture of polymeric long chain polybasic carboxylic acids, is further characterized by the following specifications:

| | |
|---|---|
| Acid No. | 150 to 164 |
| Saponification No. | 175 to 186 |
| Free fatty acids | 75 to 82% |
| Iodine value | 44 to 55 |

The trimeric acid which is the major constituent of the above described acids has the following probable formula:

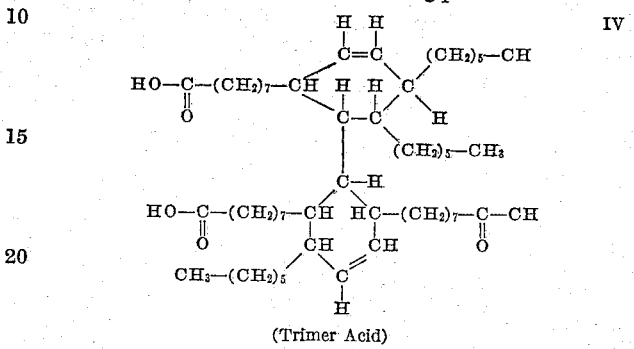

IV (Trimer Acid)

The imidazoline salts of the type herein-above described can be readily prepared by mixing the selected imidazoline and the carboxylic acid of the type described herein in mol ratios of 1:1 to 2:1, respectively and warming the reaction mixture at a temperature of from about 80° F. to 120° F., with or without a suitable catalyst, until a homogeneous product is obtained.

Numerous halogenated pesticides may be stabilized against decomposition and loss of emulsifiability by incorporating the present additive in hydrocarbon solutions of the pesticide. An illustrative list of such insecticides is:

| Common name | Chemical name |
|---|---|
| DDT, dichloro-diphenyl-trichloro-ethane. | 1,1,1-trichloro-2,2-bis(p-chlorophenyl) ethane. |
| Methoxychlor | 1,1,1,-trichloro-2,2-bis(p-methoxyphenyl) ethane. |
| TDE | 1,1-dichloro-2,2-bis(p-chlorophenyl) ethane. |
| DFTD | 1,1,1-trichloro-2,2-bis(p-fluorophenyl) ethane. |
| Lindane, benzene hexa-chloride. | Gamma hexachlorocyclohexane. |
| Chlordan | 1,2,4,5,6,7,8,8 - octachloro-4-7-methano-3a,4,7,7a-tetrahydroindan. |
| Aldrin | 1,2,3,4,10,10-hexachloro-1,4,4a,5,8,8a-hexahydro-1,4,5,8-dimethano-naphthalene. |
| Dieldrin | 1,2,3,4,10,10-hexachloro-6,7-epoxy-1,4,4a,5,6,7,8,8a-octahydro-1,4,5,8-dimethano naphthalene. |
| Toxaphene | Polychlorinated bicyclic terpenes. |

These compounds are normally made up and stored in the form of 10–80% concentrates in hydrocarbon oils, particularly, in light oils which are highly aromatic, and may generally contain varying concentrations of emulsifiers. Non-ionic emulsifiers, such as the monoesters of polyhydric alcohols, ether alcohols, the "Igepals" (condensation products of alkylphenols with ethylene oxide), are preferred for use when imidazoline salts are employed. These so-called emulsifiable concentrates form stable emulsions when mixed with water, and may be broadcast on vegetation either by ground or aeronautical spraying.

Halogenated weed killers, such as the esters of 2,4-dichloro-phenoxyacetic acid (2,4-D) are also commonly formulated as concentrated solutions in hydrocarbon solvents containing emulsifiers, and these concentrates may be stabilized in accordance herewith.

The preparation of illustrative imidazoline salts is demonstrated by the following example:

PREPARATION OF IMIDAZOLINE SALT

The acid employed was a mixture of polymerized carboxylic acids available under the trade name "D–50 Acid" obtained from the Harchem Division of Wallace and Tiernan Co. This acid as described above is produced as a byproduct in the manufacture of sebacic acid from castor oil (the glyceride of ricinoleic acid) and contains the trimer of lineolic acid as a major constituent. It also contains substantial portions of the dimer and some heavier polymers. 238.5 pounds of the acid was added to 137.5 pounds of 1-hydroethyl-2-heptadecenylimidazoline, and sufficient catalytic cycle oil was introduced as an inert diluent to make 100 gallons. The additive was stirred at room temperature for about five minutes.

| Additive | Strip appearance, days on test | | | | |
|---|---|---|---|---|---|
| | 0 | 3 | 7 | 14 | 40 |
| 0.1% imidazoline salt additive | OK | OK | Several spots of red rust | Small areas of sl. red rust. | Strip discolored, moderate pitting. |
| 0.1% commercial glycol ester inhibitor. | OK | Strip blackened. | Extensive black | 100% black | 100% black, considerable black sediment. |
| 0.1% dehydro-abietyl amine naphthenate. | OK | Black | do | do | 100% black, sl. black sediment. |
| Blank | OK | do | do | do | 100% black, some black sediment. |

To demonstrate the remarkable inhibiting effect of imidazoline salts on emulsifiable concentrates containing various halogenated organic pesticides, samples of several concentrates were made up and were subjected to an accelerated decomposition test.

ACCELERATED PESTICIDE DECOMPOSITION TEST

The test is conducted by placing 70 ml. of the concentrate or inhibited concentrate in a 4 ounce tall form bottle into which had been previously placed a ½" x 5" strip of thoroughly cleaned and polished "black iron." The bottle containing the iron, concentrate, and any inhibitor, is then tightly corked and maintained at room temperature in the presence of sunlight. (Sunlight exerts a powerful accelerating action on the decomposition of halogenated compounds, and three days' exposure in sunlight causes more decomposition than three months' testing in darkness.) The visible appearance of the iron test strip after various time intervals is taken as an indication of inhibitor effectiveness; a halogenated insecticide or herbicide which decomposes forms hydrogen chloride which attacks the iron and turns it black. This black corrosion product is readily distinguishable from the red iron oxide rust formed by the presence of water.

Example I

A 25% emulsifiable DDT concentrate was tested by exposing a blank sample of the concentrate and two samples inhibited with the imidazoline salt additive previously prepared. Additive concentrations in this and in the following examples are expressed in terms of imidazoline salt plus cycle oil diluent. The concentrate consisted of 25% DDT, 72.5% aromatics-rich solvent (predominantly toluene and xylenes), 2% non-ionic emulsifier, and 0.5% soda mahogany soap. The following results were observed:

| Additive concentration, weight percent | Strip appearance, hours on test | | | | |
|---|---|---|---|---|---|
| | 0 | 120 | 192 | 288 | 864 |
| 0.1 | OK | OK | OK | OK | OK. |
| 0.03 | OK | OK [1] | OK | Sl. stain at interface. | Black. |
| Blank | OK | Black [1] | Black | Black | Do. |

[1] Some separation of emulsifier noted.

Example II

A low-cost 25% emulsifiable DDT concentrate was tested for stability without any inhibitor, with 0.1% of the inhibitor of the present invention, and with the same concentration of two commercial inhibitors. The DDT concentrate consisted of 25 wt. percent DDT, 74.5% aromatics-rich solvent, and 0.5% commercial Emulsol H-83x emulsifier. The following results were observed:

Example III

To determine the relationship between DDT stability and additive concentration, the following series of tests was conducted using a 25% DDT concentrate in 74.5% aromatics-rich solvent containing 0.5% commercial non-ionic emulsifier. The following results were obtained:

| Additive concentration, percent | Strip appearance, days on test | | | | |
|---|---|---|---|---|---|
| | 0 | 3 | 7 | 14 | 60 |
| 0.1 | OK | OK | OK | OK | 100% black, no sediment. |
| 0.05 | OK | OK | OK | 50% discoloration | 100% black, sediment. |
| 0.03 | OK | OK | Sl. black | 50% black, rest is discolored | Do. |
| 0.01 | OK | OK | Black | 100% black, sl. sediment | Do. |
| 0.001 | OK | Black | 100% black | do | Do. |
| Blank | OK | do | 100% black, sl. sediment | 100% black, sediment | Do. |

Example IV

The imidazoline salt additive was used to inhibit a corn spray oil consisting of 7.1 wt. percent DDT, 22% aromatics-rich solvent, 69.9% mineral seal oil, 0.85 commercial Igepal CO-530 (General Aniline and Film) emulsifier, and 0.15% calcium mahogany soap. The following results were obtained:

| Additive concentration, weight percent | Strip appearance, hours on test | | | |
|---|---|---|---|---|
| | 0 | 120 | 550 | 888 |
| 0.1 | OK | OK [1] | OK | OK. |
| Blank | OK | OK | Red rust | Severe red rust. |

[1] Some additive separated out.

Example V

A 2,4-D weed killer, consisting of 31.6 wt. percent isopropyl ester of 2,4-D, 47.4% butyl ester of 2,4-D, 16.5% heater oil, 3% commercial non-ionic emulsifier, and 11.5% calcium mahogany soap, was tested with various concentrations of the imidazoline salt additive. The following results were obtained:

| Additive concentration, wt. percent | Strip appearance, hours on test | | |
|---|---|---|---|
| | 0 | 240 | 528 |
| 0.1 | OK | OK | Black spots and streaks. |
| 0.05 | OK | Black spots and streaks. | Do. |
| 0.03 | OK | do | Do. |
| Blank | OK | do | Do. |

STORAGE AND EMULSION TEST

In several additional tests, various emulsifiable pesticide concentrates were stored in gallon metal cans in an unheated room in a northern climate for periods of several months. At the end of a desired test period the can was examined for corrosion and the emulsion tested for retention of emulsifiability characteristics. The emulsion test consisted of mixing two parts by volume of concentrate with eight parts of tap water in a 4 ounce tall form bottle, vigorously shaking the mixture for several minutes to obtain an emulsion, and setting the bottle aside for three hours. At the end of this period, the emulsion is rated "pass" if no free oil is present.

*Example VI*

To demonstrate long-term emulsion stability and pesticide decomposition inhibition achieved with the present additive, tests were conducted with a 25 wt. percent emulsifiable DDT concentrate in 74.5% aromatics-rich solvent containing 0.5% commercial non-ionic emulsifier. The following results were observed:

| Additive concentration, percent | Can appearance, months on test | | | | Emulsion, months on test | | | |
|---|---|---|---|---|---|---|---|---|
| | 0 | 6 | 7 | 14 | 0 | 6 | 7 | 14 |
| 0.03 | OK | OK | Black spots. | Black spots. | OK | OK | OK | Fail. |
| Blank | OK | | Black | | OK | OK | Fail | Do. |

It is particularly observed that the present additive substantially improved emulsion stability as well as inhibited DDT decomposition in this actual long-term storage test.

It is therefore evident that imidazoline salts according to the present invention, when present in relatively small concentrations, provide outstanding storage stability for hydrocarbon solutions of halogen-containing organic pesticides.

All percentages, unless otherwise stated, are expressed on a weight basis.

We claim:

1. A composition comprising a halogenated organic compound selected from the group consisting of 1,1,1-trichloro-2,2-bis(p-chlorophenyl) ethane, 1,1,1-trichloro-2,2-bis(p-methoxyphenyl) ethane, 1,1-dichloro-2,2-bis(p-chlorophenyl) ethane, 1,1,1-trichloro - 2,2 - bis(p-fluorophenyl) ethane, gamma hexachlorocyclohexane, 1,2,4,5,6,7,8,8-octachloro - 4,7 - methano - 3a,4,7,7a - tetrahydroindan, 1,2,3,4,10,10-hexachloro-1,4,4a,5,8,8a-hexahydro-1,4,5,8-dimethanonaphthalene, 1,2,3,4,10,10-hexachloro-6,7-epoxy - 1,4,4a,5,6,7,8,8a - octahydro - 1,4,5,8-dimethanonaphthalene, polychlorinated bicyclic terpenes and an ester of 2,4-dichlorophenoxyacetic acid selected from the group consisting of isopropyl esters, butyl esters and mixtures thereof; a hydrocarbon solvent; and from about 0.001% to about 1.0% of a substituted imidazoline salt having the structural formula

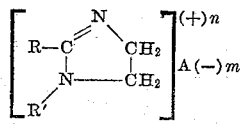

in which R is a hydrocarbon radical having from about 6 to about 24 carbon atoms selected from the group consisting of an alkyl radical, an alkenyl radical, an alkadienyl radical and mixtures thereof, R' is selected from the group consisting of a hydrogen atom, a hydroxyethyl radical, and an aminoethyl radical, A is an anion of a polyunsaturated aliphatic carboxylic acid having from about 10 to about 60 carbon atoms, and $n$ and $m$ are integers from 1 to 3 inclusive.

2. Composition of claim 1 wherein said compound is 1,1,1-trichloro-2,2-bis(p-chlorophenyl) ethane.

3. Composition of claim 1 wherein said compound is an ester of 2,4-dichlorophenoxyacetic acid, said ester being selected from the group consisting of isopropyl esters, butyl esters and mixtures thereof.

4. Composition of claim 1 in which R is an alkenyl radical of from about 6 to about 24 carbon atoms, R' is an aminoethyl radical, $n$ and $m$ are 1, and A is an anion of an aliphatic carboxylic acid having about 10 to about 60 carbon atoms.

5. Composition of claim 1 in which R is an alkyl radical of from about 6 to about 24 carbon atoms, R' is an aminoethyl radical, $n$ and $m$ are 1, and A is an anion of an aliphatic carboxylic acid having from about 10 to about 60 carbon atoms.

6. Composition of claim 1 in which A is the anion of polymerized linoleic acid.

7. Composition of claim 6 in which the polymerized linoleic acid comprises at least one member of the group consisting of dilinoleic acid and trilinoleic acid.

8. An emulsifiable insecticide concentrate comprising 1,1,1-trichloro - 2,2 - bis(p-chlorophenyl) ethane, a non-ionic emulsifier, a hydrocarbon solvent, and from about 0.001% to about 1.0% by weight of linoleic acid salt of 1-hydroxyethyl-2-heptadecenyl imidazoline.

9. An emulsifiable herbicide concentrate comprising an ester of 2,4-dichlorophenoxyacetic acid, said ester being selected from the group consisting of isopropyl esters, butyl esters and mixtures thereof; a non-ionic emulsifier; a hydrocarbon solvent; and from about 0.001% to about 1.0% by weight of linoleic acid salt of 1-hydroxyethyl-2-heptadecenyl imidazoline.

10. In a system wherein a halogenated organic compound selected from the group consisting of 1,1,1-trichloro - 2,2 - bis(p-chlorophenyl) ethane, 1,1,1-trichloro-2,2-bis(p-methoxyphenyl) ethane, 1,1-dichloro-2,2-bis(p-chlorophenyl) ethane, 1,1,1-trichloro - 2,2 - bis(p-fluorophenyl) ethane, gamma hexachlorocyclohexane, 1,2,4,5,6,7,8,8-octachloro - 4,7 - methano - 3a,4,7,7a - tetrahydroindan, 1,2,3,4,10,10-hexachloro-1,4,4a,5,8,8a-hexahydro-1,4,5,8-dimethanonaphthalene, 1,2,3,4,10,10-hexachloro-6,7-epoxy - 1,4,4a,5,6,7,8,8a - octahydro - 1,4,5,8-dimethanonaphthalene, polychlorinated bicyclic terpenes and an ester of 2,4-dichlorophenoxyacetic acid selected from the group consisting of isopropyl esters, butyl esters and mixtures thereof is dissolved in a hydrocarbon solvent and decomposes to form halogen halides, the method of stabilizing said halogenated organic compound comprising the step of adding to said system from about 0.001 to about 1.0 percent by weight of an imidazoline salt having the structural formula

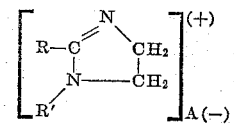

in which R is a hydrocarbon radical having from about 6 to about 24 carbon atoms selected from the group consisting of an alkyl radical, an alkenyl radical, an alkadienyl radical and mixtures thereof, R' is a member selected from the group consisting of a hydrogen atom, a hydroxyethyl radical, and an aminoethyl radical, and A is an anion of a poly unsaturated aliphatic carboxylic acid having at least 10 carbon atoms.

11. In a system wherein 1,1,1-trichloro-2,2-bis(p-chlorophenyl) ethane is dissolved in a hydrocarbon solvent, the method of stabilizing said 1,1,1-trichloro-2,2-bis(p-chlorophenyl) ethane comprising the step of adding to said system about 0.001 to about 1.0 percent by weight of linoleic acid salt of 1-hydroxyethyl-2-heptadecenyl imidazoline.

12. In a system wherein an ester of 2,4-dichlorophenoxyacetic acid selected from the group consisting of isopropyl esters, butyl esters and mixtures thereof is dissolved in a hydrocarbon solvent, the method of stabilizing said ester comprising the step of adding to said system about 0.001 to about 1.0 percent by weight of linoleic acid salt of 1-hydroxyethyl-2-heptadecenyl imidazoline.

References Cited in the file of this patent

UNITED STATES PATENTS

| | | |
|---|---|---|
| 2,540,177 | Kiff | Feb. 6, 1951 |
| 2,789,115 | Hogsett | Apr. 16, 1957 |
| 2,839,467 | Hutchison et al. | June 17, 1958 |

OTHER REFERENCES

Zimmerman et al.: Handbook of Material Trade Names, page 43, 1953.